No. 897,460. PATENTED SEPT. 1, 1908.
W. A. GREENLAW.
FLEXIBLE PIPE JOINT.
APPLICATION FILED AUG. 16, 1907.
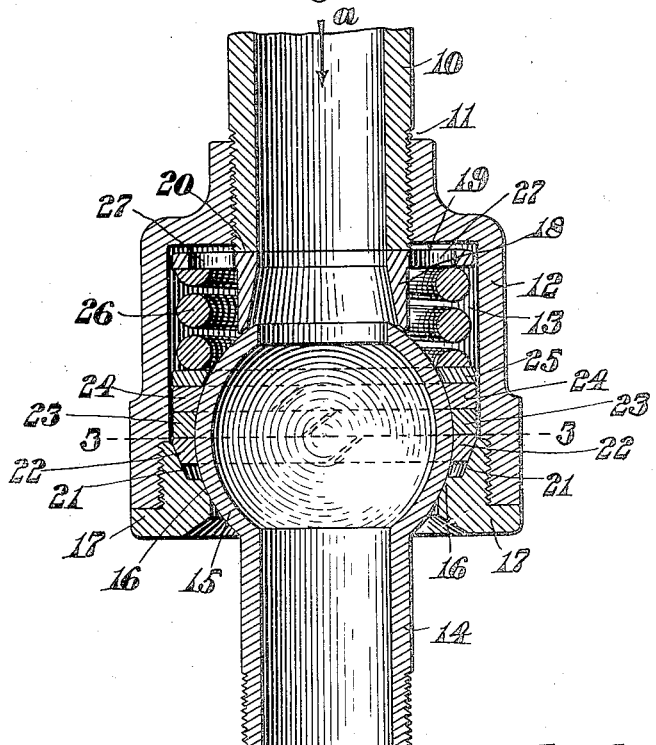
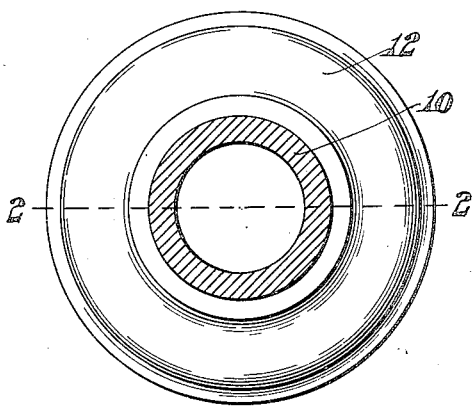
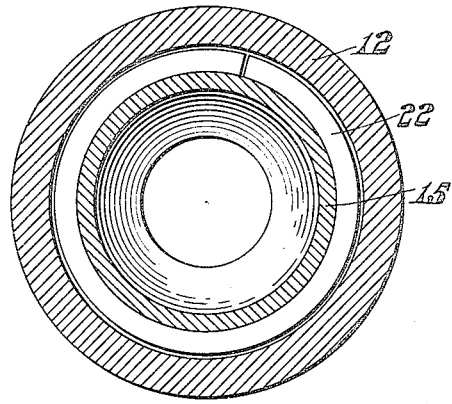
Witnesses:
Nathan C. Lombard
Howard Hanscom
Inventor:
Warren A. Greenlaw,
by Walter E. Lombard,
Atty.

UNITED STATES PATENT OFFICE.

WARREN ALFRED GREENLAW, OF MELROSE HIGHLANDS, MASSACHUSETTS, ASSIGNOR TO THE GREENLAW MANUFACTURING CO., OF BOSTON, MASSACHUSETTS, A CORPORATION OF MAINE.

FLEXIBLE PIPE-JOINT.

No. 897,460.      Specification of Letters Patent.      Patented Sept. 1, 1908.

Application filed August 16, 1907. Serial No. 388,860.

*To all whom it may concern:*

Be it known that I, WARREN ALFRED GREENLAW, a citizen of the United States of America, and a resident of Melrose Highlands, in the county of Middlesex and State of Massachusetts, have invented certain new and useful Improvements in Flexible Pipe-Joints, of which the following is a specification.

This invention relates to flexible pipe joints and has for its principal object the production of a device for effecting the packing of the joint so that leakage therefrom is effectually prevented.

It has for a further object the production of a suitable removable stop to limit the inward movement of the two pipe members.

The invention consists in certain novel features of construction and arrangement of parts which will be readily understood by reference to the description of the drawings and to the claims hereinafter given.

Of the drawings: Figure 1 represents a plan of a pipe embodying the features of this invention. Fig. 2 represents a vertical transverse section of the same, the cutting plane being on line 2—2 on Fig. 1, and Fig. 3 represents a transverse section of the same, the cutting plane being on line 3—3 on Fig. 2.

Similar characters designate like parts throughout the several figures of the drawings.

In the drawings, 10 represents the end of a pipe member which has threaded thereto at 11 the cup-shaped member 12 provided with an enlarged chamber 13 in axial line with the pipe member 10. The coöperating pipe member 14 is provided with a ball-shaped end 15 which is adapted for insertion into the chamber 13 and is provided with a seat 16 therein on the cap 17 threaded to the open end of the cup-shaped member 12. This seat 16 prevents the outward movement of the ball 15 while the inward movement thereof is prevented by the tubular stop 18 formed upon the removable annular plate 19 which is adapted to be seated against the end 20 of the pipe member 10 which extends slightly into the chamber 13 for this purpose.

The cap 17 is provided with an inclined annular wall 21 which is adapted to act upon the split packing ring 22 to force it into firm contact with the exterior surface of the ball 15 to prevent leakage from the chamber 13.

Superimposed upon the packing 22 are other split packing rings 23 and 24 on the latter of which is mounted a follower 25 between which and the annular member 19 is interposed a spiral spring 26 which is adapted to force the ball 15 to its seat 16 and the packing rings 24 and 25 firmly against the exterior surface of the ball 15 while the ring 22 is at the same time forced more firmly against the exterior surface of the ball 15 by the action of the inclined wall 21. This makes a very effective form of packing which prevents the steam or other material passing through the joint in the direction of the arrow "*a*," Fig. 2, from passing into the chamber 13 and then leaking by the exterior surface of the ball 15.

The tendency of the material passing through the pipe joint is to force the ball 15 hard against its seat 16 and any of the material which passes into the chamber 13 acts upon the packings to force them downward so that the ring 22 is acted upon by the inclined wall 21 to still more effectually pack the ball.

If the material is passed through the pipe joint from the opposite direction the tubular stop 18 limits the movement of the ball in that direction and the material collected in the chamber tends to force the packing to its seat in the same manner as if the material passed through the pipe joint from the opposite direction.

By providing the pipe member 10 with screw threads to which the cup-shaped member 12 may be threaded simplifies the construction of the joint and by permitting the end of the pipe member 10 to extend slightly beyond the inner wall of the chamber 13 thereby providing a seat for the removable ball stop 18 and 19 as is shown in the drawings, still further simplifies the construction of the joint while at the same time it permits the cup-shaped member 12 to be adjusted so that the inward movement of the ball 15 may be regulated to a nicety and the tension of the spring 26 increased or decreased at will. The ball stop 18—19 is provided with a plurality of openings 27 therethrough which are adapted to permit the free passage of any material passing through the joint so that no pressure may come on this stop which cannot readily be cared for by the spring 26.

It is believed that with the foregoing description the operation of the invention and the many advantages thereof will be fully apparent without further description.

Having thus described my invention, I claim:

1. In a flexible pipe joint, the combination of a pipe member provided with a cup-shaped end; a second pipe member having a ball-shaped end adapted to enter said cup-shaped end; a seat for said ball secured to said cup-shaped end; a packing adapted to impinge on the surface of said ball; an annular removable member interposed between said ball end and the bottom of said cup-shaped member and provided with a tubular stop for limiting the inward movement of said ball; and a spring interposed between said packing and annular member.

2. In a flexible pipe joint, the combination of a pipe member provided with a cup-shaped end; a second pipe member having a ball-shaped end adapted to enter said cup-shaped end; a seat for said ball secured to said cup-shaped end and provided with an inclined annular wall; a packing adapted to be operated by said inclined wall to cause it to impinge on the surface of said ball; an annular removable member interposed between said ball end and the bottom of said cup-shaped member and provided with a tubular stop for limiting the inward movement of said ball; and a spring interposed between said packing and annular member.

3. In a flexible pipe joint, the combination of a pipe member provided with a cup-shaped end; a second pipe member having a ball-shaped end adapted to enter said cup-shaped end; a seat for said ball secured to said cup-shaped end; a packing interposed between said ball and the walls of said cup-shaped end; a removable ball stop provided with an outwardly extending flange having a plurality of perforations therethrough; and a spring between said packing and said flange.

Signed by me at Boston, Mass., this 13th day of August, 1907.

WARREN ALFRED GREENLAW.

Witnesses:
WALTER E. LOMBARD,
NATHAN C. LOMBARD.